Aug. 14, 1928.

J. B. STRAUSS 1,680,821

BRIDGE

Filed Dec. 20, 1920

Inventor
Joseph B. Strauss
By Parker & Carter Attys

Patented Aug. 14, 1928.

1,680,821

UNITED STATES PATENT OFFICE.

JOSEPH B. STRAUSS, OF CHICAGO, ILLINOIS.

BRIDGE.

Application filed December 20, 1920. Serial No. 431,849.

This invention relates to improvements in bascule bridges and has for its object to provide a new and improved device of this description wherein the counterweight is not mounted upon the main span, but is operatively connected therewith so as to counterbalance such main span.

Referring now to the accompanying drawings

Like numerals refer to like parts throughout the several figures.

Figure 1:
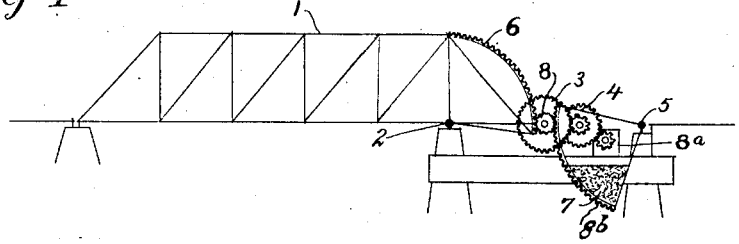
Fig. 1 is a view of a bascule bridge embodying one form of the invention.

Referring now to the drawings I have illustrated in Fig. 1 a main span 1, mounted upon pivots or trunnions 2, carried by a suitable support. Back of the main span is a counterweight 7, carried by a counterweight frame 4, mounted upon pivots or trunnions 5 at a distance from the pivots or trunnions 2 of the main span. Some suitable means is provided for connecting the counterweight with the main span so that such counterweight will counterbalance the main span. As shown in Fig. 1 the main span is provided with a rack 6, and the counterweight frame with a rack 7. A pinion 8 is provided which engages these two racks. This pinion is operated by some suitable device, such as a motor 8ª connected by a gear train 3 with the pinion 8. It will be noted that when the pinion 8 is rotated the racks with which it is associated will move in opposite directions. When the pinion is rotated in one direction the main span will be moved so as to lift it to its open position, while the counterweight will be moved upwardly as indicated by the arrow, and this counterweight will be applied to the main span to counterbalance it in all its various positions.

Figure 2:
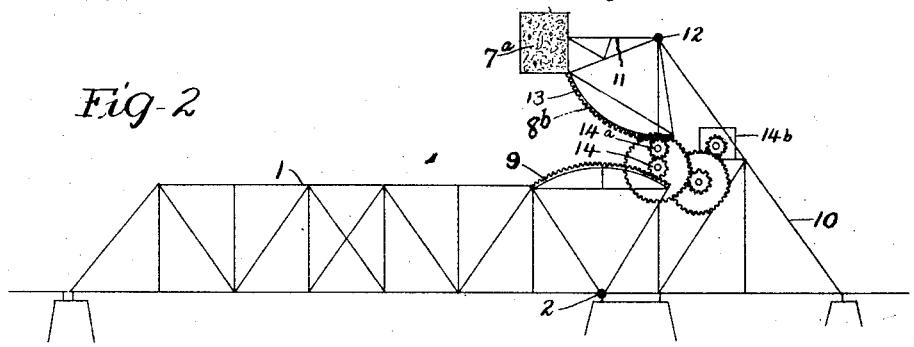
Fig. 2 is a view similar to Fig. 1 with the counterweight in a different position.

Referring now to Fig. 2 I have shown the main span 1 pivoted at 2, and provided with a rack 9. Back of the main span is a stationary counterweight support 10. The counterweight 7ª in this case is connected by a strut or link 11 with the counterweight support 10, the strut or link 11 being pivoted at 12 with the counterweight. The rack 9 engages the pinion 14, and the rack 13 engages the pinion 14ª, the pinion 14ª rotating in the opposite direction from the pinion 14 so that as the main span is lifted the counterweight will be lowered. There are preferably two sets of racks, one at each side of the bridge, and the counterweight passes between the rack 9 as the main span is opened. The counterweight thus counterbalances the main span in all its various positions. The pinions 14 and 14ª may be operated in any desired manner as by means of the motor 14ᵇ. This motor is connected through suitable reducing gears with the pinion 14, and the pinion 14ª meshes with the pinion 14 so as to be driven thereby, but rotating in the opposite direction.

Figure 3:
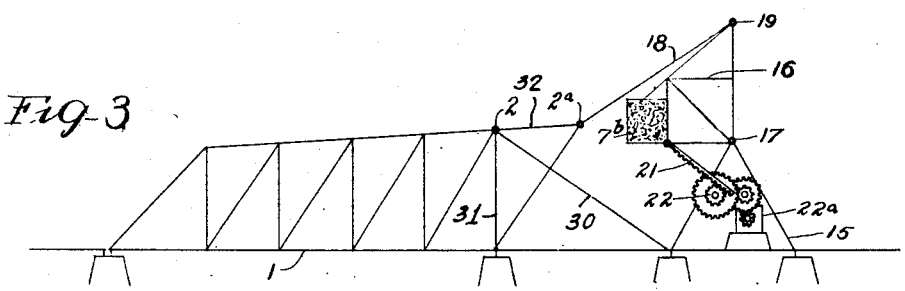
Fig. 3 is a view similar to Fig. 1 showing a modified construction.

In Fig. 3 the main span 1 is mounted upon the pivots 2, and there is a stationary counterweight support 15 back of the main span. The counterweight 7ᵇ is mounted upon a movable counterweight frame 16 which is mounted upon the trunnion 17 on the counterweight support 16. A link 18 connects the counterweight frame 16, and the main span 1, and is pivotally connected at 19 with the counterweight frame and at 2ª with the main span. The bridge may be operated by any suitable mechanism as by an operating strut 21 which connects with the counterweight frame 16 and which is operated by a pinion 22, engaging teeth on the operating strut. The pinion 22 may be driven from a suitable motor 22ª supported on a suitable support. It will be noted that when the pinion is rotated to move the operating strut to the right, the outer end of the main span will be lifted, and when moved in the opposite direction the outer end of the main span will be lowered, and that the counterweight is applied to the main span in all its various positions so as to counterbalance it. In this figure the main span is mounted on the trunnions 2 upon the fixed support which consists of the vertical member from the trunnion 2 to the pier and the diagonal member from the trunnion 2 to the frame 15. When the counterweight frame is pulled down pressure is exerted at 2ª on the main span to rotate it about its pivot.

Figure 4:
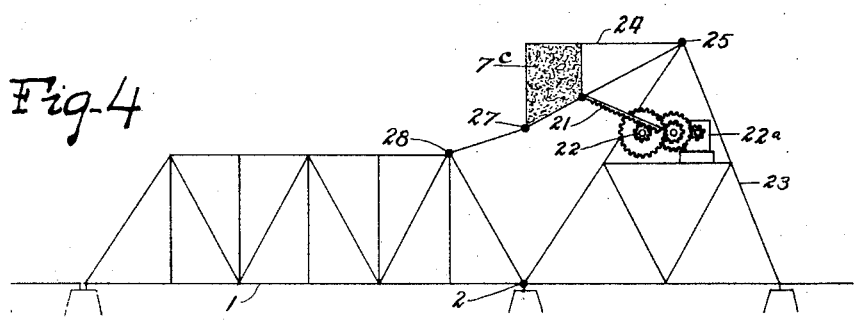
Fig. 4 is a view showing a further modification.

In Fig. 4 I have shown a construction where the main span 1 is mounted upon the trunnions 2, and there is a stationary counterweight support 23 back of the main span. The counterweight 7ᶜ is carried by a counterweight frame 24, pivoted at 25 to the counterweight support 23. A link is pivoted at 27 with the counterweight frame and at 28 with the main span. This construction is also operated by an operating strut 21 which is engaged by a pinion 22 actuated by a motor 22ª similar to the construction of Fig. 3.

It will be noted that in all these constructions the counterweight is separate from the main span but is applied thereto so as to counterbalance the main span in all its various positions, and that such counterweight when the bridge is closed is located between the end of the top chord of the main span and the trunnions of the counterweight.

It will further be noted that when the bridge is closed the counterweight in Figs. 1, 3 and 4 is located between the trunnions of the main span and the trunnions of the counterweight.

I have described in detail forms embodying the invention, but it is of course evident that the parts may be varied in many particulars, without departing from the spirit of the invention, as embodied in the claims hereto appended, and I therefore do not limit myself to the particular constructions shown.

In the claims where I have used the word "forward" I mean to indicate a position of the counterweight which is between the pivot and the main span, and where I state that the trunnions of the counter-weight are located back of the main span I mean at a point back of the heel end of the main span.

Where in the description and the claims I have referred to a rigid member or members, between the main span and the counterweight I include only such member or members as will take or resist compression so as to resist the movement of the main span with relation to the counterweight when the said connection is under compression.

I claim:

1. A bascule bridge comprising a main span, trunnions upon which it is mounted, a counterweight separate from said main span, separate trunnions upon which said counterweight is mounted, a link connecting said counterweight with said main span, mechanism for moving the parts so that the counterweight counterbalances the main span while it is being opened and closed, said counterweight located between the end of the top chord of the main span and the trunnions of the counterweight when the bridge is closed.

2. A bascule bridge comprising a main span, trunnions upon which it is mounted, a counterweight separate from said main span, said counterweight pivotally mounted back of said main span, a counterweight frame carrying said counterweight, said counterweight frame pivotally supported back of said main span, a link connecting the counterweight frame with the main span, operating mechanism for moving said counterweight frame so as to open and close said main span, said counterweight located between the end of the top chord of said main span and the pivot of said counterweight frame when the bridge is closed.

3. A bascule bridge comprising a main span mounted on trunnions, a fixed counterweight support projecting above the roadway, a counterweight rotatably mounted on said support, a motor for actuating the main span, the main span and motor being relatively movable, a connection between the main span and the motor and a connection between the main span and the counterweight, said latter connection including a portion of the connection between the main span and the motor.

4. A bascule bridge having a stationary pivot a bridge leaf mounted thereon a counterweight a stationary pivot for supporting the counterweight at a point remote from the bridge supporting pivot a linkwork connecting the counterweight and the bridge leaf to force them to rotate always in counter directions around the pivots said linkwork being rigid whereby it is effective both in pushing and pulling and a power device applied to the counterweight for rotating it and thereby rotating the bridge leaf.

Signed at Chicago, county of Cook, and State of Illinois, this 18th day of December, 1920.

JOSEPH B. STRAUSS.